United States Patent
Pan et al.

(10) Patent No.: US 11,706,859 B2
(45) Date of Patent: Jul. 18, 2023

(54) INPUT DEVICE WITH BACKLIGHT FUNCTION AND BACKLIGHT COLOR ADJUSTMENT METHOD THEREOF

(71) Applicant: Primax Electronics Ltd., Taipei (TW)

(72) Inventors: Ding-Hsiang Pan, Taipei (TW); Hui-Ling Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 22 days.

(21) Appl. No.: 17/534,556

(22) Filed: Nov. 24, 2021

(65) Prior Publication Data
US 2023/0103868 A1    Apr. 6, 2023

(30) Foreign Application Priority Data
Oct. 6, 2021    (TW) ................ 110137236

(51) Int. Cl.
*G06F 3/02* (2006.01)
*H05B 47/14* (2020.01)

(52) U.S. Cl.
CPC ........... *H05B 47/14* (2020.01); *G06F 3/0202* (2013.01)

(58) Field of Classification Search
None
See application file for complete search history.

(56) References Cited

U.S. PATENT DOCUMENTS

| 2018/0136737 A1* | 5/2018 | Amarilio | G06F 3/0202 |
| 2020/0253009 A1* | 8/2020 | Hsu | H05B 47/155 |

* cited by examiner

*Primary Examiner* — Dedei K Hammond
(74) *Attorney, Agent, or Firm* — Kirton McConkie; Evan R. Witt (57) ABSTRACT

An input device with a backlight function and a backlight color adjustment method are provided. The input device with the backlight function includes a casing, plural color light-emitting elements, a control module and a charge-coupled device. The control module provides electric power to at least two selected color light-emitting elements through a power supply circuit. By the control module, the chromaticity value of a mixed white light beam from the color light-emitting element is adjusted to be consistent with the chromaticity value of a white light beam, and the luminance value of the mixed white light beam from the color light-emitting element is adjusted to be consistent with the luminance value of the white light beam.

13 Claims, 5 Drawing Sheets

INPUT DEVICE WITH BACKLIGHT FUNCTION AND BACKLIGHT COLOR ADJUSTMENT METHOD THEREOF

FIELD OF THE INVENTION

The present invention relates to an input device, and more particularly to an input device with a backlight function.

BACKGROUND OF THE INVENTION

With increasing development of science and technology, computer devices become essential tools in homes or workplaces. Generally, the computer host is controlled by the user through an input device. For example, the input device is a touch screen, a keyboard, a mouse, or the like.

In order to improve the functionality and the practicality of the input devices, many input devices additionally have the backlight function. Due to the backlight function, the input device can provide different luminous visual effects. In addition, the user can still operate the input device in a dim or dark environment. Moreover, since the backlight function can prompt the user, the user can operate the input device more convenient.

The input device with the backlight function is usually equipped with a color light-emitting element having a red light-emitting unit, a green light-emitting unit and a blue light-emitting unit. The red light-emitting unit, the green light-emitting unit and the blue light-emitting unit can be driven to produce a mixed light beam. Alternatively, the input device with the backlight function is equipped with a color light-emitting element having a red light-emitting unit, a green light-emitting unit, a blue light-emitting unit and a white light-emitting unit. The red light-emitting unit, the green light-emitting unit, the blue light-emitting unit and the white light-emitting unit can be driven to produce a mixed light beam. Generally, the color light-emitting element having the red, green, blue and white light-emitting units consumes less electric power, and thus it is usually applied to the input device. However, when compared with the color light-emitting element having the red, green and blue light-emitting units, the color light-emitting element having the red, green, blue and white light-emitting units have some drawbacks. For example, after the mixed light beam is subjected to a gray level adjustment process, the luminance value and the chromaticity value may be suffered deviation.

In accordance with a conventional technology, a gray level adjustment process was disclosed in Taiwanese Patent No. I696409 for example. However, in case that the backlight module of the input device comprises plural color light-emitting elements, the conventional technology still has some drawbacks. For example, the gray level adjustment process needs to be performed on all color light-emitting elements simultaneously. That is, the conventional technology is unable to perform the gray level adjustment process on the individual color light-emitting elements. In other words, the overall power consumption of the backlight module is high.

Therefore, there is a need of providing a power-saving input device with a backlight function in order to overcome the drawbacks of the conventional technology.

SUMMARY OF THE INVENTION

The present invention provides an input device with a backlight function and a backlight color adjustment method. Since electric power is selectively provided to individual color light-emitting elements, the power-saving efficacy is enhanced.

In accordance with an aspect of the present invention, a backlight color adjustment method for an input device is provided. The input device includes plural color light-emitting elements. Each color light-emitting element includes a red light-emitting unit, a green light-emitting unit, a blue light-emitting unit and a white light-emitting unit. The backlight color adjustment method includes the following steps. In a step (A), electric power is provided to at least two selected color light-emitting elements of the plural color light-emitting elements. In a step (B), the white light-emitting unit of each of the selected color light-emitting elements is driven to emit a first white light beam. In a step (C), first chromaticity value and a first luminance value of the first white light beam are measured. In a step (D), the red light-emitting unit, the green light-emitting unit and the blue light-emitting unit of each of the selected color light-emitting elements generates a first mixed white light beam according to the corresponding first chromaticity value. In a step (E), a first mixed chromaticity value and a first mixed luminance value of the first mixed white light beam are measured. In a step (F), the first mixed chromaticity value and the first chromaticity value of each of the selected color light-emitting elements are adjusted to be consistent with each other. Consequently, a first adjusting parameter corresponding to the red light-emitting unit, the green light-emitting unit and the blue light-emitting unit is acquired. In a step (G), the white light-emitting unit of each of the selected color light-emitting elements is driven to emit a second white light beam according to the corresponding first mixed luminance value, or the red light-emitting unit, the green light-emitting unit and the blue light-emitting unit of each of the selected color light-emitting elements are driven to emit a second mixed white light beam according to the corresponding first luminance value. In a step (H), a second luminance value of the second white light beam is measured, or a second mixed luminance value of the second mixed white light beam is measured. In a step (I), the second luminance value and the first mixed luminance value of each of the selected color light-emitting elements are adjusted to be consistent with each other so as to acquire a second adjusting parameter corresponding to the white light-emitting unit, or the second mixed luminance value and the first luminance value of each of the selected color light-emitting elements are adjusted to be consistent with each other so as to acquire a third adjusting parameter corresponding to the red light-emitting unit, the green light-emitting unit and the blue light-emitting unit. In a step (J), a gray level adjustment process is performed according to the first adjusting parameter and the second adjusting parameter, or the gray level adjustment process is performed according to the first adjusting parameter and the third adjusting parameter.

In an embodiment, the step (D) includes the following sub-steps. In a sub-step (D1), a current value corresponding to the red light-emitting unit is adjusted according to the corresponding first chromaticity value, so that the red light-emitting unit generate a first red light beam. In a sub-step (D2), a current value corresponding to the green light-emitting unit is adjusted according to the corresponding first chromaticity value, so that the green light-emitting unit generate a first green light beam. In a sub-step (D3), a current value corresponding to the blue light-emitting unit is adjusted according to the corresponding first chromaticity value, so that the blue light-emitting unit generate a first blue light beam.

In an embodiment, the step (F) includes the following sub-steps. Firstly, the sub-step (F1) is performed to judge whether the first mixed chromaticity value corresponding to the first mixed white light beam is consistent with the first chromaticity value. If the first mixed chromaticity value is consistent with the first chromaticity value, a next step (F2) is performed. If the first mixed chromaticity value is not consistent with the first chromaticity value, the step (D) is repeatedly done. In the sub-step (F2), a current value corresponding to the red light-emitting unit, a current value corresponding to the green light-emitting unit and a current value corresponding to the blue light-emitting unit are retrieved as the first adjusting parameter.

Preferably, in the step (G), a current value corresponding to the white light-emitting unit is adjusted according to the corresponding first mixed luminance value. Consequently, the white light-emitting unit emit the second white light beam.

In an embodiment, the step (G) includes the following sub-steps. In a sub-step (G1), a current value corresponding to the red light-emitting unit is adjusted according to the corresponding first luminance value, so that the red light-emitting unit generate a second red light beam. In a sub-step (G2), a current value corresponding to the green light-emitting unit is adjusted according to the corresponding first luminance value, so that the green light-emitting unit generate a second green light beam. In a sub-step (G3), a current value corresponding to the blue light-emitting unit is adjusted according to the corresponding first luminance value, so that the blue light-emitting unit generate a second blue light beam.

In an embodiment, the step (I) includes the following sub-steps. Firstly, a sub-step (I1) is performed to judge whether the second luminance value corresponding to the second white light beam is consistent with the first mixed luminance value. If the second luminance value is consistent with the first mixed luminance value, a next step (2) is performed. If the second luminance value is not consistent with the first mixed luminance value, the step (G) is repeatedly done. In the sub-step (I2), a current value corresponding to the white light-emitting unit is retrieved as the second adjusting parameter.

In an embodiment, the step (I) includes the following sub-steps. Firstly, a sub-step (I1) is performed to judge whether the second mixed luminance value corresponding to the second mixed white light beam is consistent with the first luminance value. If the second mixed luminance value is consistent with the first luminance value, a next step (I2) is performed. If the second mixed luminance value is not consistent with the first luminance value, the step (G) is repeatedly done. In the sub-step (I2), a current value corresponding to the red light-emitting unit, a current value corresponding to the green light-emitting unit and a current value corresponding to the blue light-emitting unit are retrieved as the third adjusting parameter.

In accordance with another aspect of the present invention, an input device with a backlight function is provided. The input device includes a casing, plural color light-emitting elements, a control module and a charge-coupled device. The plural color light-emitting elements are disposed within the casing, wherein each of the plural color light-emitting elements includes a red light-emitting unit, a green light-emitting unit, a blue light-emitting unit and a white light-emitting unit. The red light-emitting unit, the green light-emitting unit, the blue light-emitting unit and the white light-emitting unit are controlled to selectively emit a red light beam, a green light beam, a blue light beam and a white light beam to the casing, respectively. The control module is disposed within the casing, and electrically connected with the plural color light-emitting elements. The control module includes a power supply circuit. The charge-coupled device senses chromaticity values and luminance values of the red light beam, the green light beam, the blue light beam and the white light beam. The control module provides electric power to at least two selected color light-emitting elements of the plural color light-emitting elements through the power supply circuit. After the control module adjusts current values corresponding to the red light-emitting unit, the green light-emitting unit, the blue light-emitting unit and the white light-emitting unit, a chromaticity value of a mixed white light beam of the red light beam, the green light beam and the blue light beam is consistent with the chromaticity value of the white light beam, and a luminance value of the mixed white light beam is consistent with the luminance value of the white light beam.

In an embodiment, when the chromaticity value of the mixed white light beam is consistent with the chromaticity value of the white light beam, the control module retrieves the current value corresponding to the red light-emitting unit, the current value corresponding to the green light-emitting unit and the current value corresponding to the blue light-emitting unit as a first adjusting parameter.

In an embodiment, the luminance value of the white light beam is adjusted to be consistent with the luminance value of the mixed white light beam, the control module retrieves the current value corresponding to the white light-emitting unit as a second adjusting parameter.

In an embodiment, when the luminance value of the mixed white light beam is adjusted to be consistent with the luminance value of the white light beam, the control module retrieves the current value corresponding to the red light-emitting unit, the current value corresponding to the green light-emitting unit and the current value corresponding to the blue light-emitting unit as a third adjusting parameter.

From the above descriptions, the input device and the backlight color adjustment method of the present invention is advantageous over the conventional technology. For example, the control module of the input device provides electric power to at least two selected color light-emitting elements through the power supply circuit, and the control module controls the chromaticity values and the luminance values of the light beams from the selected color light-emitting elements. Consequently, the power-saving efficacy is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
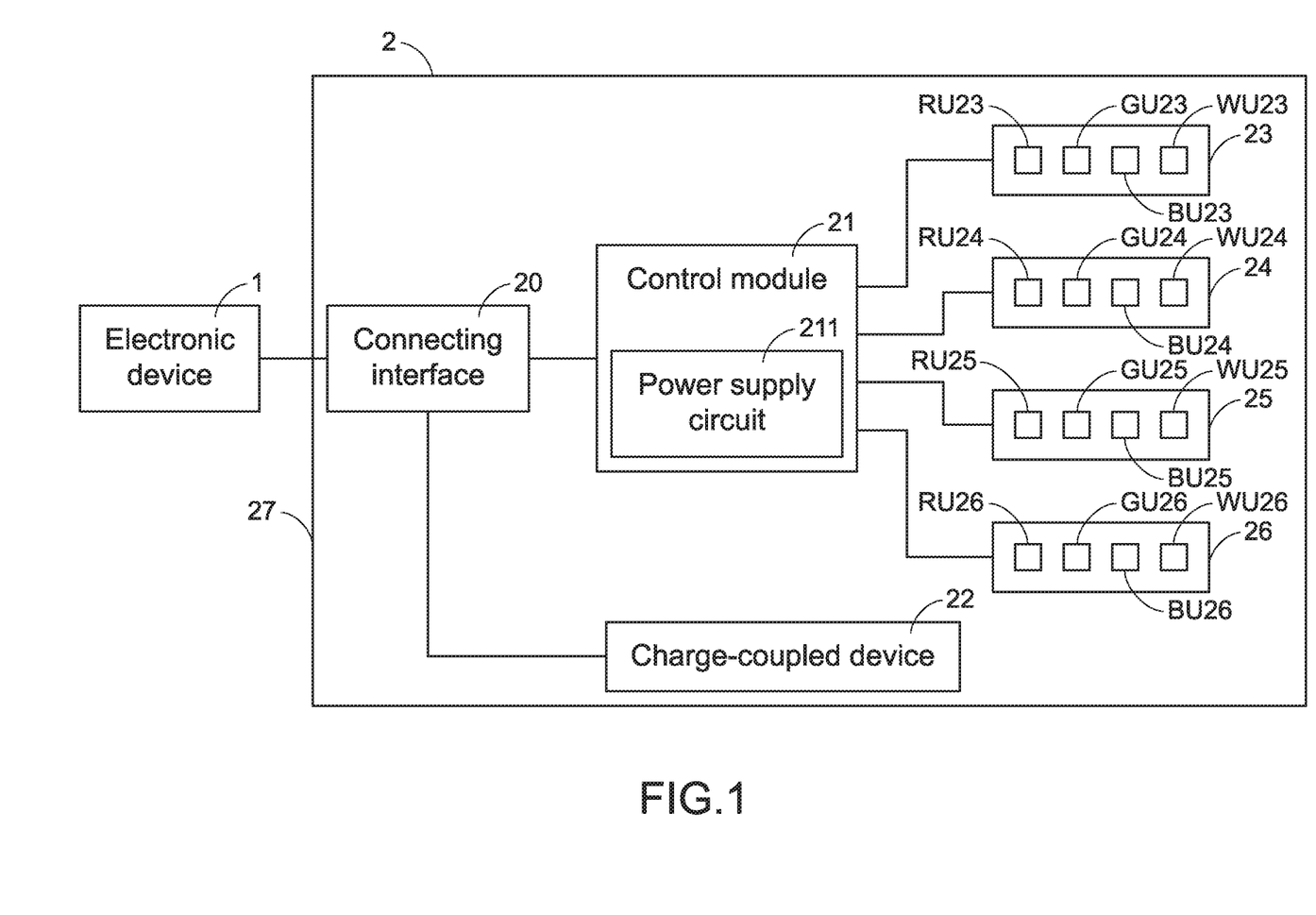
FIG. 1 is a schematic functional block diagram illustrating the architecture of an input device with a backlight function according to an embodiment of the present invention.
Figure 2:
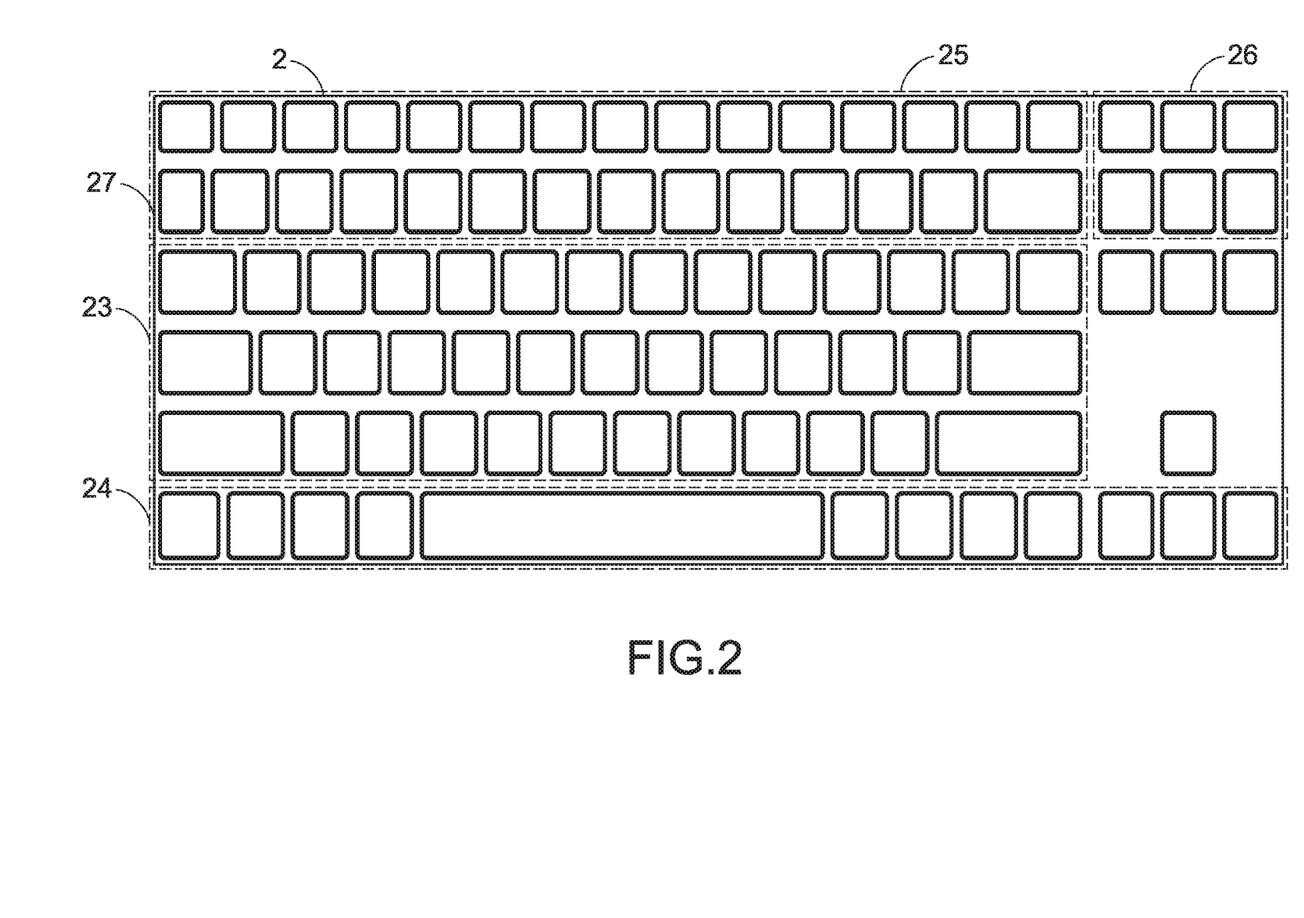
FIG. 2 is a schematic top view illustrating an example of the input device with the backlight function according to the embodiment of the present invention.

Please refer to FIGS. 1 and 2. FIG. 1 is a schematic functional block diagram illustrating the architecture of an input device with a backlight function according to an embodiment of the present invention. FIG. 2 is a schematic top view illustrating an example of the input device with the backlight function according to the embodiment of the present invention. As shown in FIG. 1, the input device 2 is connected with an electronic device 1. The input device 2 comprises a connecting interface 20, a control module 21, a charge-coupled device (CCD) 22, plural color light-emitting elements 23, 24, 25, 26 and a casing 27.

The connecting interface 20, the control module 21, the charge-coupled device 22 and the plural color light-emitting elements 23, 24, 25, 26 are disposed within the casing 27. The connecting interface 20 is electrically connected with the control module 21 and the charge-coupled device 22. In addition, the connecting interface 20 is in communication with the external electronic device 1 in a wired transmission manner or a wireless transmission manner. The input device 2 receives electric power or control signals from the electronic device 1 through the connecting interface 20. For example, the electronic device 1 is a desktop computer, a notebook computer or a tablet computer, and the input device 2 is a keyboard, a mouse, a touch screen, a handwriting pad or a touch pad.

The control module 21 is a microcontroller (MCU) or a driver IC. In addition, the control module 21 comprises a power supply circuit 211. In an embodiment, the control module 21 is electrically connected with the color light-emitting elements 23, 24, 25 and 26. In addition, the control module 21 can selectively provide electric power to at least two of the color light-emitting elements 23, 24, 25 and 26 through the power supply circuit 211. Consequently, the at least two elected color light-emitting elements of the color light-emitting elements 23, 24, 25 and 26 can project corresponding color light beams to different regions of the casing 27, or the chromaticity values and the luminance values of the color light beams from the at least two elected color light-emitting elements of the color light-emitting elements 23, 24, 25 and 26 can be adjusted.

As shown in FIG. 2, the input device 2 with the backlight function is a backlight keyboard. The color light-emitting elements 23, 24, 25 and 26 are disposed within the casing 27. The color light-emitting element 23 is located under the ordinary key region. The color light-emitting element 24 is located under the combination key region. The color light-emitting element 25 is located under the shortcut key region. The color light-emitting element 26 is located under the numeric key region. Due to this arrangement, the color light-emitting element under each key region can project the color light beam to the corresponding key region.

Please refer to FIG. 1 again. The color light-emitting element 23 comprises a red light-emitting unit RU23, a green light-emitting unit GU23, a blue light-emitting unit BU23 and a white light-emitting unit WU23. Similarly, the color light-emitting element 24 comprises a red light-emitting unit RU24, a green light-emitting unit GU24, a blue light-emitting unit BU24 and a white light-emitting unit WU24. Similarly, the color light-emitting element 25 comprises a red light-emitting unit RU25, a green light-emitting unit GU25, a blue light-emitting unit BU25 and a white light-emitting unit WU25. Similarly, the color light-emitting element 26 comprises a red light-emitting unit RU26, a green light-emitting unit GU26, a blue light-emitting unit BU26 and a white light-emitting unit WU26.

The control unit 21 can drive the red light-emitting units RU23~RU26, the green light-emitting unit GU23~GU26, the blue light-emitting units BU23~BU26 and the white light-emitting units WU23~WU26 individually or simultaneously. Take the color light-emitting element 23 for example. In an embodiment, the control module 21 can individually drive the red light-emitting unit RU23, the green light-emitting unit GU23, the blue light-emitting unit BU23 or the white light-emitting unit WU23 of the color light-emitting element 23 to project the red light beam, the green light beam, the blue light beam or the white light beam to the casing 27. Alternatively, the control module 21 can simultaneously drive the red light-emitting unit RU23, the green light-emitting unit GU23 and the blue light-emitting unit BU23 of the color light-emitting element 23 to project a mixed white light beam to the casing 27. Consequently, the input device 1 with the backlight function can generate various luminous visual effects.

In the above embodiment, four color light-emitting elements 23, 24, 25 and 26 are disposed within the casing 27. It is noted that the number of the color light-emitting elements may be varied according to the practical requirements of the input device.

The charge-coupled device 22 is used to detect the chromaticity values and luminance values of the red light beams, the green light beams, the blue light beams and the white light beams from the red light-emitting units RU23~RU26, the green light-emitting unit GU23~GU26, the blue light-emitting units BU23~BU26 and the white light-emitting units WU23~WU26 of the color light-emitting elements 23, 24, 25 and 26. In addition, the chromaticity values, the luminance values and associated parameter information are transmitted from the charge-coupled device 22 to the control module 21 through the connecting interface 20. According to the received chromaticity values and the luminance values, the current values corresponding to the red light-emitting units RU23~RU26, the green light-emitting unit GU23~GU26, the blue light-emitting units BU23~BU26 and the white light-emitting units WU23~WU26 of the color light-emitting elements 23, 24, 25 and 26 are adjusted by the control module 21. Consequently, the chromaticity value of the mixed white light beam of the red light beam, the green light beam and the blue light beam can be adjusted to be consistent with the chromaticity value of the corresponding white light beam, and the luminance value of the mixed white light can be adjusted to be consistent with the luminance value of the corresponding white light beam. In this embodiment, the charge-coupled device 22 is electrically connected with the connecting interface 20. It is noted that numerous modifications and alterations may be made while retaining the teachings of the invention. For example, in another embodiment, the charge-coupled device 22 is directly and electrically connected with the control module 21.

Figure 3:
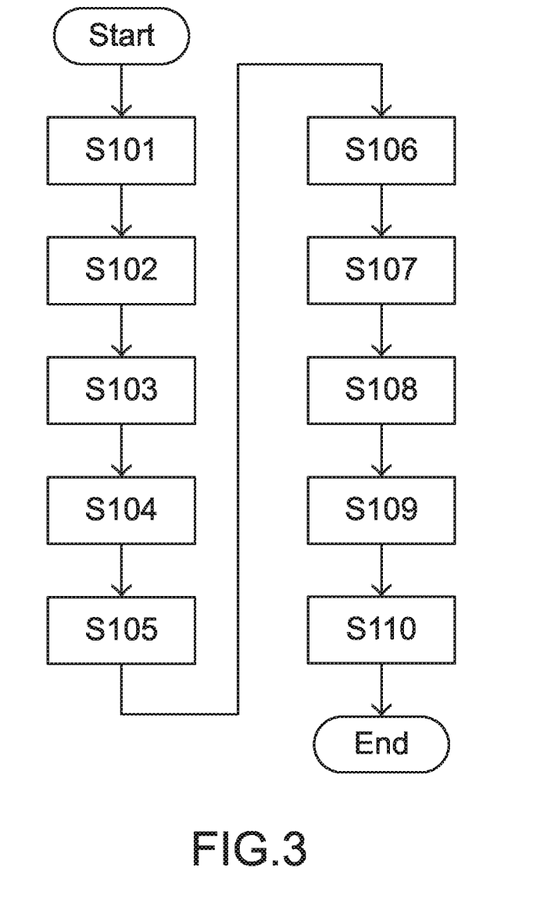
FIG. 3 is a flowchart of a backlight color adjustment method according to an embodiment of the present invention.
Figure 4:
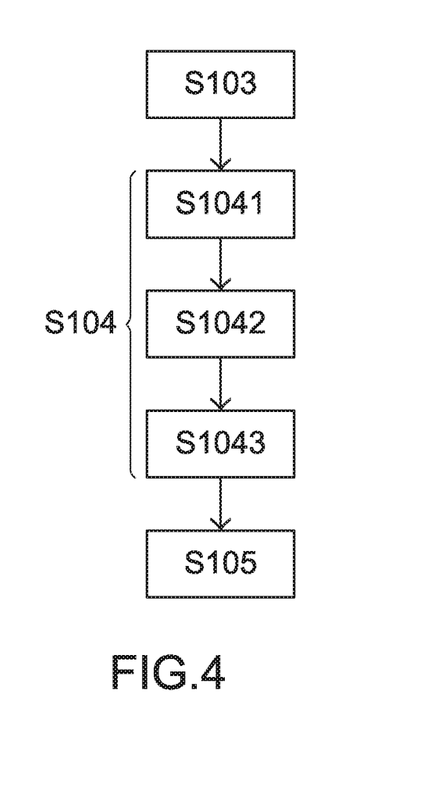
FIG. 4 is a flowchart illustrating the step S104 of the backlight color adjustment method as shown in FIG. 3.
Figure 5:
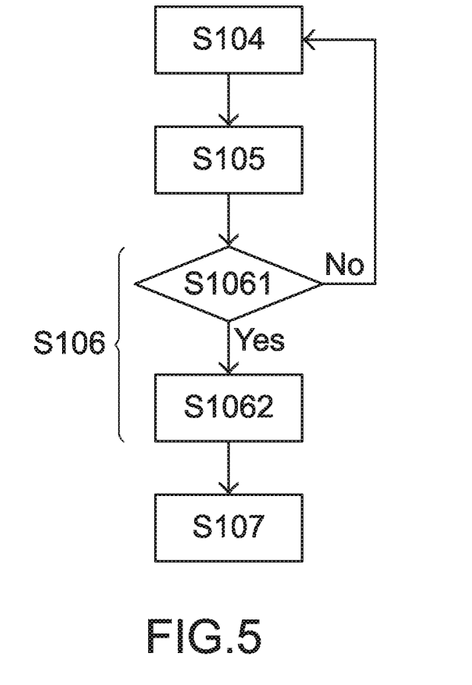
FIG. 5 is a flowchart illustrating the step S106 of the backlight color adjustment method as shown in FIG. 3.
Figure 6:
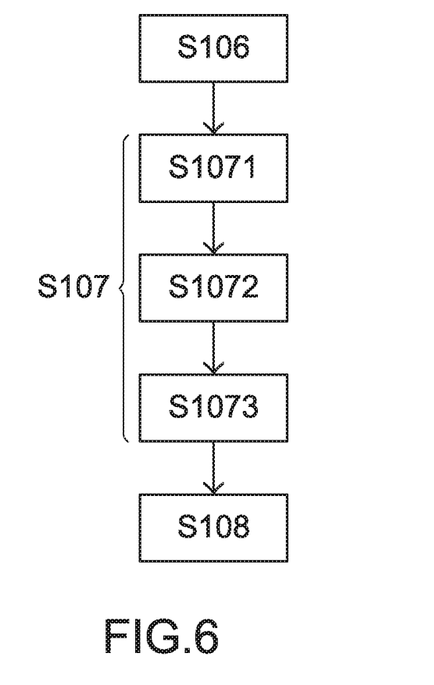
FIG. 6 is a flowchart illustrating the step S107 of the backlight color adjustment method as shown in FIG. 3.
Figure 7A:
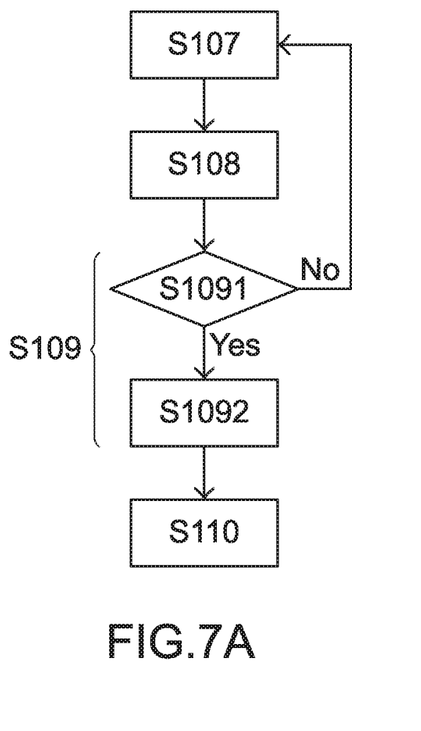
FIG. 7A is a flowchart illustrating a first example of the step S109 of the backlight color adjustment method as shown in FIG. 3.
Figure 7B:
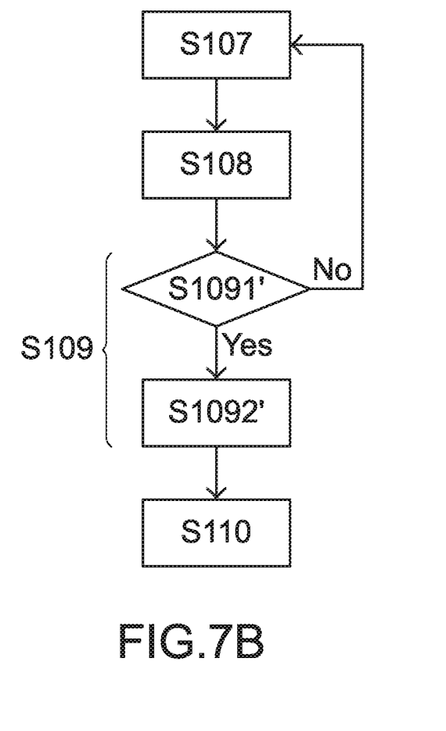
FIG. 7B is a second example of the step S109 of the backlight color adjustment method as shown in FIG. 3.

Please refer to FIGS. 3, 4, 5, 6, 7A and 7B. FIG. 3 is a flowchart of a backlight color adjustment method according to an embodiment of the present invention. FIG. 4 is a flowchart illustrating the step S104 of the backlight color adjustment method as shown in FIG. 3. FIG. 5 is a flowchart illustrating the step S106 of the backlight color adjustment method as shown in FIG. 3. FIG. 6 is a flowchart illustrating the step S107 of the backlight color adjustment method as shown in FIG. 3. FIG. 7A is a flowchart illustrating a first example of the step S109 of the backlight color adjustment method as shown in FIG. 3. FIG. 7B is a second example of the step S109 of the backlight color adjustment method as shown in FIG. 3.

Please refer to FIG. 3. Firstly, electric power is provided to at least two selected color light-emitting elements of the plural color light-emitting elements (Step S101). In the step S101, the to-be-adjusted color light-emitting elements (i.e., two or more color light-emitting elements of the color light-emitting elements 23, 24, 25 and 26) are automatically selected by the control module 21. Alternatively, the user may operate a control interface (not shown) of the electronic device 1 to manually select two or more to-be-adjusted color light-emitting elements. In this embodiment, the control module 21 selects the color light-emitting elements 23 and 25 and adjusts the chromaticity values and the luminance values of the selected color light-emitting elements 23 and 25. In the subsequent adjustment steps, the chromaticity value and the luminance value are respectively represented by the coordinate (x, y) in the CIE 1931 color space and the symbol L. In addition, the symbol in the bracket after (x, y) and L represents the corresponding light-emitting unit.

Then, the white light-emitting units WU23 and WU25 of the selected color light-emitting elements 23 and 25 are driven to emit first white light beams (Step S102). In the step S120, the white light-emitting units WU23 and WU25 are driven to emit the first white light beams, respectively.

Then, the first chromaticity values (xw1, yw1)(WU23), (xw1, yw1)(WU25) and the first luminance values Lw1(WU23), Lw1(WU25) of the corresponding first white light beams are measured (Step S103). In the step S103, the charge-coupled device 22 simultaneously or sequentially measures the first white beams from the color light-emitting elements 23 and 25. Consequently, the first chromaticity values (xw1, yw1)(WU23), (xw1, yw1)(WU25) and the first luminance values Lw1(WU23), Lw1(WU25) of the corresponding first white light beams are acquired. In addition, the first chromaticity values (xw1, yw1)(WU23), (xw1, yw1)(WU25), the first luminance values Lw1(WU23), Lw1(WU25) and associated parameter information are transmitted from the charge-coupled device 22 to the control module 21.

Then, the red light-emitting unit RU23, the green light-emitting unit GU23 and the blue light-emitting unit BU23 collaboratively produce a first mixed white light beam according to the first chromaticity value (xw1, yw1)(WU23), and the red light-emitting unit RU25, the green light-emitting unit GU25 and the blue light-emitting unit BU25 collaboratively produce another first mixed white light beam according to the first chromaticity value (xw1, yw1)(WU25) (Step S104). Please refer to FIG. 4. In the step S104, the control module 21 performs the steps S1041, S1042 and S1043 according to the sensed first chromaticity values (xw1, yw1)(WU23) and (xw1, yw1)(WU25). In the step S1041, the current values corresponding to the red light-emitting units RU23 and RU25 are adjusted according to the first chromaticity values (xw1, yw1)(WU23) and (xw1, yw1)(WU25). Consequently, the red light-emitting units RU23 and RU25 generate the corresponding first red light beams. In the step S1042, the current values corresponding to the green light-emitting units GU23 and GU25 are adjusted according to the first chromaticity values (xw1, yw1)(WU23) and (xw1, yw1)(WU25). Consequently, the green light-emitting units GU23 and GU25 generate the corresponding first green light beams. In the step S1043, the current values corresponding to the blue light-emitting units BU23 and BU25 are adjusted according to the first chromaticity values (xw1, yw1)(WU23) and (xw1, yw1)(WU25). Consequently, the blue light-emitting units BU23 and BU25 generate the corresponding first blue light beams. In this way, the first red light beams, the green first red light beams and the blue first red light beams are mixed as the corresponding first mixed white light beams.

Then, the first mixed chromaticity values $(xw_{mix}1, yw_{mix}1)$(RU23, GU23, BU23), $(xw_{mix}1, yw_{mix}1)$(RU25, GU25, BU25) and the first mixed luminance values $Lw_{mix}1$(RU23, GU23, BU23), $Lw_{mix}1$(RU25, GU25, BU25) of the corresponding first mixed white light beams are measured (Step S105). In the step S105, the charge-coupled device 22 simultaneously or sequentially measures the first mixed white beams from the color light-emitting elements 23 and 25. Consequently, the first mixed chromaticity values $(xw_{mix}1, yw_{mix}1)$(RU23, GU23, BU23), $(xw_{mix}1, yw_{mix}1)$(RU25, GU25, BU25) and the first mixed luminance values $Lw_{mix}1$(RU23, GU23, BU23), $Lw_{mix}1$(RU25, GU25, BU25) of the first mixed white light beams are acquired. Moreover, the first mixed chromaticity values $(xw_{mix}1, yw_{mix}1)$(RU23, GU23, BU23), $(xw_{mix}1, yw_{mix}1)$(RU25, GU25, BU25), the first mixed luminance values $Lw_{mix}1$(RU23, GU23, BU23), $Lw_{mix}1$(RU25, GU25, BU25) and associated parameter information are transmitted from the charge-coupled device 22 to the control module 21.

Then, the first mixed chromaticity values $(xw_{mix}1, yw_{mix}1)$(RU23, GU23, BU23), $(xw_{mix}1, yw_{mix}1)$(RU25, GU25, BU25) of the first mixed white light beams from the color light-emitting elements 23 and 25 are adjusted to be respectively consistent with the first chromaticity values (xw1, yw1)(WU23) and (xw1, yw1)(WU25), and thus first adjusting parameters corresponding to the red light-emitting units RU23, RU25, the green light-emitting units GU23, GU25 and the blue light-emitting units BU23, BU25 are acquired (Step S106). Please refer to FIG. 5. In the step S106, the control module 21 performs the steps S1061 and S1062 according to the first chromaticity values (xw1, yw1)(WU23), (xw1, yw1)(WU25) and the first mixed chromaticity values $(xw_{mix}1, yw_{mix}1)$(RU23, GU23, BU23), $(xw_{mix}1, yw_{mix}1)$(RU25, GU25, BU25). Firstly, the step S1061 is performed to judge whether the first mixed chromaticity values $(xw_{mix}1, yw_{mix}1)$(RU23, GU23, BU23), $(xw_{mix}1, yw_{mix}1)$(RU25, GU25, BU25) are respectively consistent with the first chromaticity values (xw1, yw1)(WU23) and (xw1, yw1)(WU25). If the judging condition of the step S1061 is satisfied, the next step S1062 is performed. Whereas, if the judging condition of the step S1061 is not satisfied, the step S104 is repeatedly done. In the step S1062, the current values corresponding to the red light-emitting units RU23, RU25, the current values corresponding to the green light-emitting units GU23, GU25 and the current values corresponding to the blue light-emitting units BU23, BU25 are respectively used as the first adjusting parameters.

In the step S1061, if the coordinates of the first mixed chromaticity values $(xw_{mix}1, yw_{mix}1)$(RU23, GU23, BU23), ($xw_{mix}1$, $yw_{mix}1$)(RU25, GU25, BU25) and the first chromaticity values (xw1, yw1)(WU23) and (xw1, yw1)(WU25) in the CIE 1931 color space substantially match each other, it means that the first mixed chromaticity values ($xw_{mix}1$, $yw_{mix}1$)(RU23, GU23, BU23), ($xw_{mix}1$, $yw_{mix}1$)(RU25, GU25, BU25) are respectively consistent with the first chromaticity values (xw1, yw1)(WU23), (xw1, yw1)(WU25). The technology about the CIE 1931 color space is well known to those skilled in the art, and not redundantly described herein.

In an embodiment, the following settings are defined in the control module 21. If both of the x coordinate difference and the y coordinate difference between the first mixed chromaticity value ($xw_{mix}1$, $yw_{mix}1$)(RU23, GU23, BU23) and the first chromaticity value (xw1, yw1)(WU23) are lower than 0.01 and both of the x coordinate difference and the y coordinate difference between the first mixed chromaticity value ($xw_{mix}1$, $yw_{mix}1$)(RU25, GU25, BU25) and the first chromaticity value (xw1, yw1)(WU25) are lower than 0.01, the control module 21 judges that the first mixed chromaticity values ($xw_{mix}1$, $yw_{mix}1$)(RU23, GU23, BU23), ($xw_{mix}1$, $yw_{mix}1$)(RU25, GU25, BU25) are respectively consistent with the first chromaticity values (xw1, yw1)(WU23), (xw1, yw1)(WU25). Otherwise, the control module 21 judges that the first mixed chromaticity values ($xw_{mix}1$, $yw_{mix}1$)(RU23, GU23, BU23), ($xw_{mix}1$, $yw_{mix}1$)(RU25, GU25, BU25) are not consistent with the first chromaticity values (xw1, yw1)(WU23), (xw1, yw1)(WU25). In this embodiment, the base value for determining the x coordinate difference and the y coordinate difference is 0.01. It is noted that the base value for determining the x coordinate difference and the y coordinate difference may be varied according to the backlight requirement of the product.

Then, in a step S107, the white light-emitting units WU23 and WU25 of the selected color light-emitting elements 23 and 25 are driven to emit second white light beams according to the first mixed luminance values $Lw_{mix}1$(RU23, GU23, BU23) and $Lw_{mix}1$(RU25, GU25, BU25), or the red light-emitting units RU23 and RU25, the green light-emitting units GU23 and GU25 and the blue light-emitting units BU23 and BU25 of the selected color light-emitting elements 23 and 25 are driven to emit second mixed white light beams according to the first luminance values Lw1(WU23) and Lw1(WU25).

Please refer to FIG. 6. In the step S107, the current values corresponding to the white light-emitting units WU23 and WU25 are adjusted by the control module 21 according to the first mixed chromaticity values $Lw_{mix}1$ (RU23, GU23, BU23) and $Lw_{mix}1$ (RU25, GU25, BU25), and thus the corresponding second white light beams are generated. For adjusting the luminance values of the mixed white light beams from the red light-emitting units RU23, RU25, the green light-emitting units GU23, GU25 and the blue light-emitting units BU23, BU25, the control module 21 performs the steps S1071, S1072 and S1073. In the step S1071, the current values corresponding to the red light-emitting units RU23 and RU25 are adjusted according to the first luminance values Lw1(WU23) and Lw1(WU25). Consequently, the red light-emitting units RU23 and RU25 generate second red light beams. In the step S1072, the current values corresponding to the green light-emitting units GU23 and GU25 are adjusted according to the first luminance values Lw1(WU23) and Lw1(WU25). Consequently, the green light-emitting units GU23 and GU25 generate second green light beams. In the step S1073, the current values corresponding to the blue light-emitting units BU23 and BU25 are adjusted according to the first luminance values Lw1 (WU23) and Lw1(WU25). Consequently, the blue light-emitting units BU23 and BU25 generate second blue light beams.

As mentioned above, the chromaticity values corresponding to the red light-emitting units RU23, RU25, the green light-emitting units GU23, GU25 and the blue light-emitting units BU23, BU25 are adjusted after the step S106 is completed. Consequently, when the current values are adjusted in the steps S1071, S1072 and S1073, the current values corresponding to the red light-emitting units RU23, RU25, the green light-emitting units GU23, GU25 and the blue light-emitting units BU23, BU25 should be increased or decreased in a proportional manner. Consequently, the chromaticity values will not be deviated again.

Then, the second luminance values Lw2(WU23) and LW2(WU25) of the second white light beams are measured, or the second mixed luminance values $Lw_{mix}2$(RU23, GU23, BU23) and $Lw_{mix}2$(RU25, GU25, BU25) of the second mixed white light beams are measured (Step S108). In the step S108, the charge-coupled device 22 simultaneously or sequentially senses the second white beams from the color light-emitting elements 23 and 25. Consequently, the second luminance values LW2(WU23), LW2 (WU25) of the second white light beams are acquired. Alternatively, the charge-coupled device 22 simultaneously or sequentially senses the second mixed white beams from the color light-emitting elements 23 and 25. Consequently, the second mixed luminance values $Lw_{mix}2$(RU23, GU23, BU23) and $Lw_{mix}2$ (RU25, GU25, BU25) of the second mixed white light beams are acquired. Moreover, the second luminance values Lw2(WU23), LW2(WU25), the second mixed luminance values $Lw_{mix}2$(RU23, GU23, BU23), $Lw_{mix}2$(RU25, GU25, BU25) and associated parameter information are transmitted from the charge-coupled device 22 to the control module 21.

Then, a step S109 is performed. In a first situation, the second luminance values Lw2(WU23) and LW2(WU25) of the second white light beams from the color light-emitting elements 23 and 25 are adjusted to be respectively consistent with the first mixed luminance values $Lw_{mix}1$(RU23, GU23, BU23), $Lw_{mix}1$(RU25, GU25, BU25). Consequently, second adjusting parameters corresponding to the white light-emitting units WU23 and WU25 are acquired. In a second situation, the second mixed luminance values $Lw_{mix}2$ (RU23, GU23, BU23) and $Lw_{mix}2$(RU25, GU25, BU25) corresponding to the color light-emitting elements 23 and 25 are adjusted to be respectively consistent with the first luminance values Lw1(WU23) and Lw1(WU25). Consequently, third adjusting parameters corresponding to the red light-emitting units RU23, RU25, the green light-emitting units GU23, GU25 and the blue light-emitting units BU23, BU25 are acquired.

Please refer to FIG. 7A. In the first situation, the final luminance values corresponding to the white light-emitting units WU23 and WU25 are adjusted. Under this circumstance, the step S109 comprises the sub-steps S1091 and S1092. Firstly, the step S1091 is performed to judge whether the second luminance values Lw2(WU23) and Lw2(WU25) of the second white light beams are respectively consistent with the first mixed luminance values $Lw_{mix}1$(RU23, GU23, BU23), $Lw_{mix}1$(RU25, GU25, BU25). If the judging condition of the step S1091 is satisfied, the next step S1092 is performed. Whereas, if the judging condition of the step S1091 is not satisfied, the step S107 is repeatedly done. In the step S1092, the current values corresponding to the color light-emitting elements 23 and 25 are retrieved as the second adjusting parameters.

Please refer to FIG. 7B. In the second situation, the final luminance values corresponding to the red light-emitting units RU23, RU25, the green light-emitting units GU23, GU25 and the blue light-emitting units BU23, BU25 are adjusted. Under this circumstance, the step S109 comprises the sub-steps S1091' and S1092'. Firstly, the step S1091' is performed to judge whether the second mixed luminance values $Lw_{mix}2$(RU23, GU23, BU23) and $Lw_{mix}2$(RU25, GU25, BU25) of the second mixed white light beams are respectively consistent with the first luminance values Lw1(WU23) and Lw1(WU25). If the judging condition of the step S1091' is satisfied, the next step S1092' is performed. Whereas, if the judging condition of the step S1091' is not satisfied, the step S107 is repeatedly done. In the step S1092', the current values corresponding to the red light-emitting units RU23, RU25, the current values corresponding to the green light-emitting units GU23, GU25 and the current values corresponding to blue light-emitting units BU23, BU25 are retrieved as the third adjusting parameters.

In the step S1091 and the step S1091', the following settings are defined in the control module 21. If the error between the second luminance values Lw2(WU23) and the first mixed luminance value $Lw_{mix}1$(RU23, GU23, BU23) is smaller than 5% and the error between the second luminance values Lw2(WU25) and the first mixed luminance value $Lw_{mix}1$(RU25, HU25, BU25) is smaller than 5%, it means that the second luminance values Lw2(WU23) and LW2(WU25) are respectively consistent with the first mixed luminance values $Lw_{mix}1$(RU23, GU23, BU23) and $Lw_{mix}1$(RU25, GU25, BU25). Similarly, if the error between the second mixed luminance value $Lw_{mix}2$(RU23, GU23, BU23) and the first luminance value Lw1(WU23) is smaller than 5% and the error between the second mixed luminance value $Lw_{mix}2$(RU25, GU25, BU25) and the first luminance value Lw1(WU25) is smaller than 5%, it means that the second mixed luminance values $Lw_{mix}2$(RU23, GU23, BU23) and $Lw_{mix}2$(RU25, GU25, BU25) are respectively consistent with the first luminance values Lw1(WU23) and Lw1(WU25). In this embodiment, the acceptable luminance error is 5%. It is noted that the acceptable luminance error is not restricted. The acceptable luminance error may be varied according to the backlight requirements of the products. For example, the acceptable luminance error is in the range between 5% and 10%.

Afterwards, a gray level adjustment process is performed according to the first adjusting parameters and the second adjusting parameters or according to the first adjusting parameters and the third adjusting parameters (Step S110).

In an embodiment, after the first adjusting parameter and the second adjusting parameter are acquired by the control module, the current ratio between the current values of the red, green, blue and white light-emitting units of each color light-emitting element can be acquired according to the first adjusting parameter and the second adjusting parameter. For example, the current value corresponding to the red light-emitting unit RU23, the current value corresponding to the green light-emitting unit GU23, the current value corresponding to blue light-emitting unit BU23 and the current value corresponding to the white light-emitting unit WU23 is acquired according to the first adjusting parameter and the second adjusting parameter. Similarly, the current value corresponding to the red light-emitting unit RU25, the current value corresponding to the green light-emitting unit GU25, the current value corresponding to blue light-emitting unit BU25 and the current value corresponding to the white light-emitting unit WU25 is acquired according to the first adjusting parameter and the second adjusting parameter.

Afterwards, the control module 21 controls the color light-emitting elements 23 and 25 to produce the mixed light beam according to the current ratios and performs the gray level adjustment process on the mixed light beams.

Similarly, after the first adjusting parameter and the third adjusting parameter are acquired by the control module, the current ratio between the current values of the red, green and blue light-emitting units of each color light-emitting element can be acquired according to the first adjusting parameter and the third adjusting parameter. For example, the current value corresponding to the red light-emitting unit RU23, the current value corresponding to the green light-emitting unit GU23 and the current value corresponding to blue light-emitting unit BU23 is acquired according to the first adjusting parameter and the third adjusting parameter. Similarly, the current value corresponding to the red light-emitting unit RU25, the current value corresponding to the green light-emitting unit GU25 and the current value corresponding to blue light-emitting unit BU25 is acquired according to the first adjusting parameter and the third adjusting parameter. Afterwards, the control module 21 controls the color light-emitting elements 23 and 25 to produce the mixed light beam according to the current ratios and performs the gray level adjustment process on the mixed light beams.

The gray level adjustment process is well known to those skilled in the art, and not redundantly described herein.

From the above descriptions, the present invention provides an input device with a backlight function and a backlight color adjustment method. The control module provides electric power to at least two selected color light-emitting elements through the power supply circuit, and the control module controls the chromaticity values and the luminance values of the light beams from the selected color light-emitting elements. After the mixed light beam is subjected to the gray level adjustment process, the errors of the luminance and the chromaticity value of the mixed light beam are largely reduced. Moreover, in the white light mode, the saved electric power is approximately 41%. Consequently, the power-saving efficacy is enhanced. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A backlight color adjustment method for an input device with plural color light-emitting elements, each color light-emitting element comprising a red light-emitting unit, a green light-emitting unit, a blue light-emitting unit and a white light-emitting unit, the backlight color adjustment method comprising steps of:
   (A) providing electric power to at least two selected color light-emitting elements of the plural color light-emitting elements;
   (B) driving the white light-emitting unit of each of the selected color light-emitting elements to emit a first white light beam;
   (C) measuring a first chromaticity value and a first luminance value of the first white light beam;
   (D) allowing the red light-emitting unit, the green light-emitting unit and the blue light-emitting unit of each of the selected color light-emitting elements to generate a first mixed white light beam according to the corresponding first chromaticity value;

(E) measuring a first mixed chromaticity value and a first mixed luminance value of the first mixed white light beam;

(F) allowing the first mixed chromaticity value and the first chromaticity value of each of the selected color light-emitting elements to be within 10% of each other, so that a first adjusting parameter corresponding to the red light-emitting unit, the green light-emitting unit and the blue light-emitting unit is acquired;

(G) driving the white light-emitting unit of each of the selected color light-emitting elements to emit a second white light beam according to the corresponding first mixed luminance value, or driving the red light-emitting unit, the green light-emitting unit and the blue light-emitting unit of each of the selected color light-emitting elements to emit a second mixed white light beam according to the corresponding first luminance value;

(H) measuring a second luminance value of the second white light beam, or measuring a second mixed luminance value of the second mixed white light beam;

(I) adjusting the second luminance value and the first mixed luminance value of each of the selected color light-emitting elements to be within 10% of each other so as to acquire a second adjusting parameter corresponding to the white light-emitting unit, or adjusting the second mixed luminance value and the first luminance value of each of the selected color light-emitting elements to be within 10% of each other so as to acquire a third adjusting parameter corresponding to the red light-emitting unit, the green light-emitting unit and the blue light-emitting unit; and (J) performing a gray level adjustment process according to the first adjusting parameter and the second adjusting parameter, or performing the gray level adjustment process according to the first adjusting parameter and the third adjusting parameter.

2. The backlight color adjustment method according to claim 1, wherein the step (D) comprises sub-steps of:
(D1) adjusting a current value corresponding to the red light-emitting unit according to the corresponding first chromaticity value, so that the red light-emitting unit generate a first red light beam;
(D2) adjusting a current value corresponding to the green light-emitting unit according to the corresponding first chromaticity value, so that the green light-emitting unit generate a first green light beam; and
(D3) adjusting a current value corresponding to the blue light-emitting unit according to the corresponding first chromaticity value, so that the blue light-emitting unit generate a first blue light beam.

3. The backlight color adjustment method according to claim 1, wherein the step (F) comprises sub-steps of:
(F1) judging whether the first mixed chromaticity value corresponding to the first mixed white light beam is within 10% of the first chromaticity value, wherein if the first mixed chromaticity value is within 10% of the first chromaticity value, a next step (F2) is performed, wherein if the first mixed chromaticity value is not within 10% of the first chromaticity value, the step (D) is repeatedly done; and
(F2) retrieving a current value corresponding to the red light-emitting unit, a current value corresponding to the green light-emitting unit and a current value corresponding to the blue light-emitting unit as the first adjusting parameter.

4. The backlight color adjustment method according to claim 1, wherein in the step (G), a current value corresponding to the white light-emitting unit is adjusted according to the corresponding first mixed luminance value, so that the white light-emitting unit emit the second white light beam.

5. The backlight color adjustment method according to claim 1, wherein the step (G) comprises sub-steps of:
(G1) adjusting a current value corresponding to the red light-emitting unit according to the corresponding first luminance value, so that the red light-emitting unit generate a second red light beam;
(G2) adjusting a current value corresponding to the green light-emitting unit according to the corresponding first luminance value, so that the green light-emitting unit generate a second green light beam; and
(G3) adjusting a current value corresponding to the blue light-emitting unit according to the corresponding first luminance value, so that the blue light-emitting unit generate a second blue light beam.

6. The backlight color adjustment method according to claim 1, wherein the step (I) comprises sub-steps of:
(I1) judging whether the second luminance value corresponding to the second white light beam is within 10% of the first mixed luminance value, wherein if the second luminance value is within 10% of the first mixed luminance value, a next step (I2) is performed, wherein if the second luminance value is not within 10% of the first mixed luminance value, the step (G) is repeatedly done; and
(I2) retrieving a current value corresponding to the white light-emitting unit as the second adjusting parameter.

7. The backlight color adjustment method according to claim 1, wherein the step (I) comprises sub-steps of:
(I1) judging whether the second mixed luminance value corresponding to the second mixed white light beam is within 10% of the first luminance value, wherein if the second mixed luminance value is within 10% of the first luminance value, a next step (I2) is performed, wherein if the second mixed luminance value is not within 10% of the first luminance value, the step (G) is repeatedly done; and
(I2) retrieving a current value corresponding to the red light-emitting unit, a current value corresponding to the green light-emitting unit and a current value corresponding to the blue light-emitting unit as the third adjusting parameter.

8. The backlight color adjustment method according to claim 1, wherein step (F) comprises allowing the first mixed chromaticity value and the first chromaticity value of each of the selected color light-emitting elements to be within 5% of each other, wherein step (I) comprises adjusting the second luminance value and the first mixed luminance value of each of the selected color light-emitting elements to be within 5% of each other so as to acquire a second adjusting parameter corresponding to the white light-emitting unit, or adjusting the second mixed luminance value and the first luminance value of each of the selected color light-emitting elements to be within 5% of each other so as to acquire a third adjusting parameter corresponding to the red light-emitting unit, the green light-emitting unit and the blue light-emitting unit.

9. An input device with a backlight function, the input device comprising:
a casing;

plural color light-emitting elements disposed within the casing, wherein each of the plural color light-emitting elements comprises a red light-emitting unit, a green light-emitting unit, a blue light-emitting unit and a white light-emitting unit, wherein the red light-emitting unit, the green light-emitting unit, the blue light-emitting unit and the white light-emitting unit are controlled to selectively emit a red light beam, a green light beam, a blue light beam and a white light beam to the casing, respectively;

a control module disposed within the casing, and electrically connected with the plural color light-emitting elements, wherein the control module comprises a power supply circuit; and a charge-coupled device that senses chromaticity values and luminance values of the red light beam, the green light beam, the blue light beam and the white light beam, wherein the control module provides electric power to at least two selected color light-emitting elements of the plural color light-emitting elements through the power supply circuit, wherein after the control module adjusts current values corresponding to the red light-emitting unit, the green light-emitting unit, the blue light-emitting unit and the white light-emitting unit, a chromaticity value of a mixed white light beam of the red light beam, the green light beam and the blue light beam is within 10% of the chromaticity value of the white light beam, and a luminance value of the mixed white light beam is within 10% of the luminance value of the white light beam.

10. The input device according to claim 9, wherein when the chromaticity value of the mixed white light beam is within 10% of the chromaticity value of the white light beam, the control module retrieves the current value corresponding to the red light-emitting unit, the current value corresponding to the green light-emitting unit and the current value corresponding to the blue light-emitting unit as a first adjusting parameter.

11. The input device according to claim 9, wherein when the luminance value of the white light beam is adjusted to be within 10% of the luminance value of the mixed white light beam, the control module retrieves the current value corresponding to the white light-emitting unit as a second adjusting parameter.

12. The input device according to claim 9, wherein when the luminance value of the mixed white light beam is adjusted to be within 10% of the luminance value of the white light beam, the control module retrieves the current value corresponding to the red light-emitting unit, the current value corresponding to the green light-emitting unit and the current value corresponding to the blue light-emitting unit as a third adjusting parameter.

13. The input device according to claim 9, wherein the chromaticity value of the mixed white light beam of the red light beam, the green light beam and the blue light beam is within 5% of the chromaticity value of the white light beam, and the luminance value of the mixed white light beam is within 5% of the luminance value of the white light beam.

* * * * *